United States Patent [19]

Burns

[11] 4,266,434

[45] May 12, 1981

[54] ROTATING OSCILLATORY MOTION POWER TAKE-OFF

[76] Inventor: David L. Burns, 4607 Griffin St., Moss Point, Miss. 39563

[21] Appl. No.: 964,966

[22] Filed: Nov. 30, 1978

[51] Int. Cl.[3] ........................ B06B 1/16; B65G 27/20

[52] U.S. Cl. .......................................... 74/61; 74/25; 74/87

[58] Field of Search ........................ 74/23, 25, 61, 87; 198/770; 209/366.5, 367; 366/128

[56] References Cited

U.S. PATENT DOCUMENTS

| | | | |
|---|---|---|---|
| 1,242,824 | 10/1917 | Lindsay | 366/128 X |
| 2,266,594 | 12/1941 | Ertel | 74/61 |
| 2,422,639 | 6/1947 | Wenander | 74/87 |
| 3,003,428 | 10/1961 | Christenson | 74/61 X |
| 3,212,345 | 10/1965 | Rechenberg et al. | 209/367 X |
| 3,308,671 | 4/1967 | Bodine | 74/87 |

FOREIGN PATENT DOCUMENTS

| | | | |
|---|---|---|---|
| 448659 | 8/1927 | Fed. Rep. of Germany | 74/61 |
| 466813 | 5/1914 | France | 74/61 |
| 44-1391 | 1/1969 | Japan | 74/25 |

*Primary Examiner*—Lawrence J. Staab

*Attorney, Agent, or Firm*—Jacobi, Lilling, Siegel & Presta

[57] ABSTRACT

A power take-off mechanism which converts rotational motion to a variety of available rotating, reciprocating and/or oscillating motions. The device comprises a rocking frame within which is mounted a rotating shaft on which is mounted an unbalanced weight. One end of the shaft is connected through a constant velocity type joint to a power source and the opposite end of the shaft rotates within a restraining ring or area on the frame. The rotating unbalanced weight transmits force through the shaft to the rocking frame which is free to pivot or move rotationally about one axis and at the same time to reciprocate axially along the same axis. Power may be taken off from various points on the frame as either reciprocating motion, reciprocating motion with a cyclicly reversing twist, circular motion inscribed on a plane of rotation, or eliptical motion inscribed on a plane of rotation.

10 Claims, 1 Drawing Figure

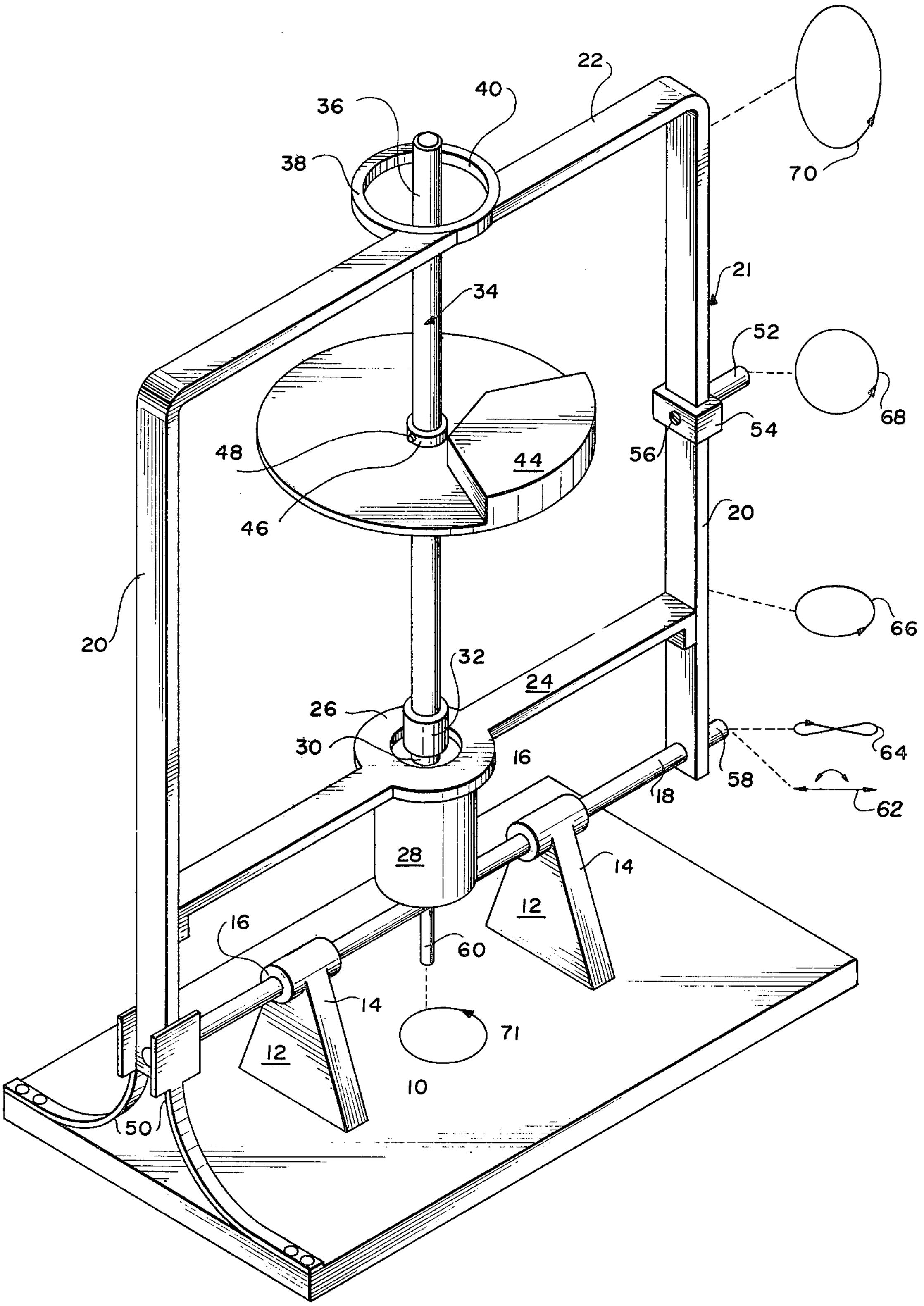
22
36
40
38
70
21
34
52
68
54
48
56
44
46
20
20
66
32
24
26
30
16
64
18
58
62
28
14
12
16
60
14
71
12
10
50

ROTATING OSCILLATORY MOTION POWER TAKE-OFF

BACKGROUND AND SUMMARY OF THE INVENTION

The use of an unbalanced rotating weight, either restrained on a fixed axis or restrained by an axis rotating within a confining ring, is disclosed in prior Pat. No. 1,210,989 to Roth, which illustrates a sifting apparatus, and U.S. Pat. No. 3,308,671 to Bodine, Jr. which utilizes the off-center weight to output a cyclic vibratory motion. Other uses of an off-center weight typically involve vibrators which are commonly used for concrete consolidation or in conveyors, hoppers or screens.

In the present invention, the rotating off-center weight is mounted within a frame structure which is free to rock on an axis and reciprocate axially along the same axis. The power output may be taken from any of a variety of locations on the frame or axis. Each power take-off location yields a different motion from the others, with a wide range of motions available. Such a power take-off apparatus is a substantial improvement over and is far more versatile than the power take-off mechanisms heretofore known or used.

BRIEF DESCRIPTION OF THE DRAWING

The drawing is a perspective view of a power take-off apparatus constructed in accordance with the principles of the present invention, showing the various motions which may be derived from the apparatus.

DESCRIPTION OF PREFERRED EMBODIMENTS

In the drawing, 10 is a base on which the power take-off apparatus of the present invention may be mounted. A pair of support members 12 are affixed to the base 10 and are provided at their upper ends 14 with bearings 16. The bearings 16 may be of any suitable construction such as the sleeve type or the ball bearing type and are mounted on the support members 12 so that their axes are aligned. The bearings 16 are of a type allowing a combination of rotating and axial movement.

Mounted on and extending through the bearings 16 is a main elongated shaft or axle member 18. Affixed to the main axle member 18 are a pair of posts 20 which are part of a frame 21. The frame posts 20 extend substantially perpendicular to the plane of the base 10. Across the top of the frame posts 20 at the opposite end from the axle member 18 is a cross piece 22 connecting the frame posts 20 to form a rigid structure.

A cross bar 24 extends between and is secured to the frame posts 20, and is provided with mounting means 26 preferably near the center of the crossbar 24.

A motor 28 or other suitable power input means is affixed to the mounting means 26 in any suitable manner with its output shaft 30 substantially aligned with the frame posts 20. Alternately, the motor 28 may be mounted directly on the main axle 18.

All of the components 18 through 26 of the frame 21 are preferably constructed from metal or another suitable lightweight structural material.

The motor 28 may be of any suitable type having a rotary output such as electric, internal combustion, or pneumatic-hydraulic, depending on the prime power sources readily available.

On the output shaft 30 of the motor 28 is mounted a constant velocity type joint 32 of any suitable type and to the opposite end of the constant velocity joint 32 is mounted a shaft 34.

The free end 36 of the shaft 34 is restrained loosely within a confining ring or area 38 affixed to or made part of the cross piece 22.

The confining ring 38 preferably is mounted on the cross piece 22 so that the shaft 34 rests against one portion of the internal surface 40 of the confining ring 38 when the shaft 34 is aligned with the output shaft 30 of the motor 28.

An off-center weight 44 of any suitable type is mounted on the shaft 34 by means of a sliding collar 46 and set screw 48, or other suitable means, which will allow adjustment of the postition of the weight 44 along the length of the shaft 34.

Springs 50 or other biasing or restraining means are attached to the base 10 and bear against one or both of the frame posts 20 or other portions of the frame 21 to urge the frame posts 20 to a generally upright or perpendicular relationship to the base 10. The strength of the springs 50 should be just sufficient to hold the frame posts 20 in the upright position when the device is at rest. The springs should be sufficiently flexible so as not to interfere with the action of the frame 21 when in motion.

A power take-off point 52 is fastened to one of the frame posts 20 by means of a bracket 54 and set screw 56 or other convenient means. In this manner, the point 52 may be moved to any suitable location on the post 20.

Another power take-off point 58 may be at one end of the main axle member 18.

Still another power take-off point 60 may be attached to the main axle member 18 at any convenient location.

In operation, the motor 28 is started and operated by any convenient power source, e.g., electric, hydraulic, pneumatic or internal combustion as may be individually preferred.

Power from the motor 28 is transmitted from the output shaft 30 through the constant velocity joint 32 to the shaft 34. As the off-center weight 44 rotates, the free end 36 of the shaft 34 swings around the inner surface 40 of the retaining ring 38. The force of the off-center weight 44 is thus transferred from the shaft 34, the ring 38 and the cross piece 22 to the frame posts 20. This motion causes the frame posts 20 to oscillate back and forth around the main axle member 18. At the same time the entire frame 21 and axle member 18 reciprocate back and forth axially through the bearings 16. Some of the resultant output movements are illustrated by the drawing which shows the power output shapes available from the power take-off points 52 and 58.

The designations 62 and 64 illustrate motions available from the take-off point 58. Diagrams 66, 68, and 70 illustrate power take-off motions available from power take-off point 52 when it is in the various positions indicated by the broken lines. Of course, the motion configurations 66, 68, and 70 must be viewed as being taken along a plane of rotation about the main axle member 18 as the frame member 20 is oscillating back and forth about the axis. Diagram 71 illustrates motion available from power take-off point 60.

By alteration of the position of the weight 44 along the shaft 34 and by altering the size and shape of the restraining ring 38 from circular to eliptical or other shapes, the operation of the apparatus may be varied to yield a greater or lesser component of energy output during different portions of the revolution of the weight 44.

What is claimed is:

1. Power take-off apparatus, comprising:

a frame having an opening therethrough, means supporting said frame for oscillatory and axial movement relative to an axis, a shaft rotatably mounted on said frame and having a free end extending through said opening in spaced relation to at least a portion of the surrounding frame surface defining said opening, a weight mounted in off-center relation of said shaft, means for rotating said shaft and said weight thereon to cause the free end of said shaft to move along the frame surface defining said opening to effect oscillation and axial movement of said frame relative to said axis, and means mounted on said frame to enable power to be taken off said frame at different points thereon which generate different power output motions.

2. The apparatus of claim 1 wherein said frame comprises a pair of depending posts connected at the upper end thereof by a cross piece having said opening therein, and said supporting means comprises a rotatable and axially movable axle member connected to said posts at the lower portion thereof.

3. The apparatus of claim 2 wherein said rotating means comprises a motor mounted on said frame, and wherein said motor is connected to said shaft by a constant velocity joint.

4. The apparatus of claim 2 wherein the longitudinal axis of said axle member is substantially horizontal, and said shaft is disposed in an upright position in substantially perpendicular relation to said axle member, the lower end of said shaft being connected to said motor and the upper end of said shaft extending through said openings.

5. The apparatus of claim 4 wherein a collar is adjustably mounted on said shaft, and said weight is mounted on said collar.

6. The apparatus of claim 5 wherein spring means engage one of said frame posts to normally maintain said posts in an upright position.

7. The apparatus of claim 6 wherein a power take-off point is secured to one of said posts.

8. The apparatus of claim 6 wherein a power take-off point is secured to said axle member.

9. The apparatus of claim 6 wherein a cross bar is connected to said posts near the lower portion thereof, and said motor is secured to said cross bar.

10. The apparatus of claim 6 wherein said opening is defined by a member secured to said cross piece.

* * * * *